(12) United States Patent
Markley et al.

(10) Patent No.: US 7,454,862 B2
(45) Date of Patent: Nov. 25, 2008

(54) FISHING POLE HANDLE HINGE ASSEMBLY AND FISHING POLE HANDLE

(75) Inventors: Duane C. Markley, Spokane Valley, WA (US); Ron Stokes, Spokane Valley, WA (US)

(73) Assignee: Eagle Mountain Brokers, Inc.

( * ) Notice: Subject to any disclaimer, the term of this patent is extended or adjusted under 35 U.S.C. 154(b) by 0 days.

(21) Appl. No.: 11/058,838

(22) Filed: Feb. 15, 2005

(65) Prior Publication Data

US 2006/0179705 A1 Aug. 17, 2006

(51) Int. Cl.
*A01K 87/00* (2006.01)
(52) U.S. Cl. .............................. 43/18.1 R; 43/18.1 CT; 43/23
(58) Field of Classification Search ............... 43/18.1 R, 43/18.1 CT, 23
See application file for complete search history.

(56) References Cited

U.S. PATENT DOCUMENTS

| | | | | |
|---|---|---|---|---|
| 595,134 A | * | 12/1897 | Bastide | 135/74 |
| 2,065,153 A | * | 12/1936 | Proudfit | 43/25 |
| 4,027,419 A | | 6/1977 | Popeil | 43/18 R |
| 5,127,182 A | * | 7/1992 | Hutchings et al. | 43/25 |
| 5,444,934 A | | 8/1995 | LaTouche | 43/18.1 |
| 5,992,079 A | | 11/1999 | Michels et al. | 43/18.1 |

OTHER PUBLICATIONS

U.S. Appl. No. 10/679,224, filed Oct. 2, 2003, Markley et al.
U.S. Appl. No. 10/655,792, filed Sep. 4, 2003, Markley et al.
U.S. Appl. No. 10/607,285, filed Jun. 25, 2003, Markley et al.

* cited by examiner

*Primary Examiner*—Kurt Rowan
(74) *Attorney, Agent, or Firm*—Wells St. John P.S.

(57) ABSTRACT

A fishing pole handle hinge assembly is provided with a first handle element, a second handle element, and a clamp. The first handle element terminates in a contact surface having a socket. The second handle element terminates in a contact surface having a tapering head configured to be received for pivotal positioning within a socket. The claim extends between the socket and the head. The clamp is configured to compress together the socket and the head to prevent movement of the socket relative to the head.

17 Claims, 6 Drawing Sheets

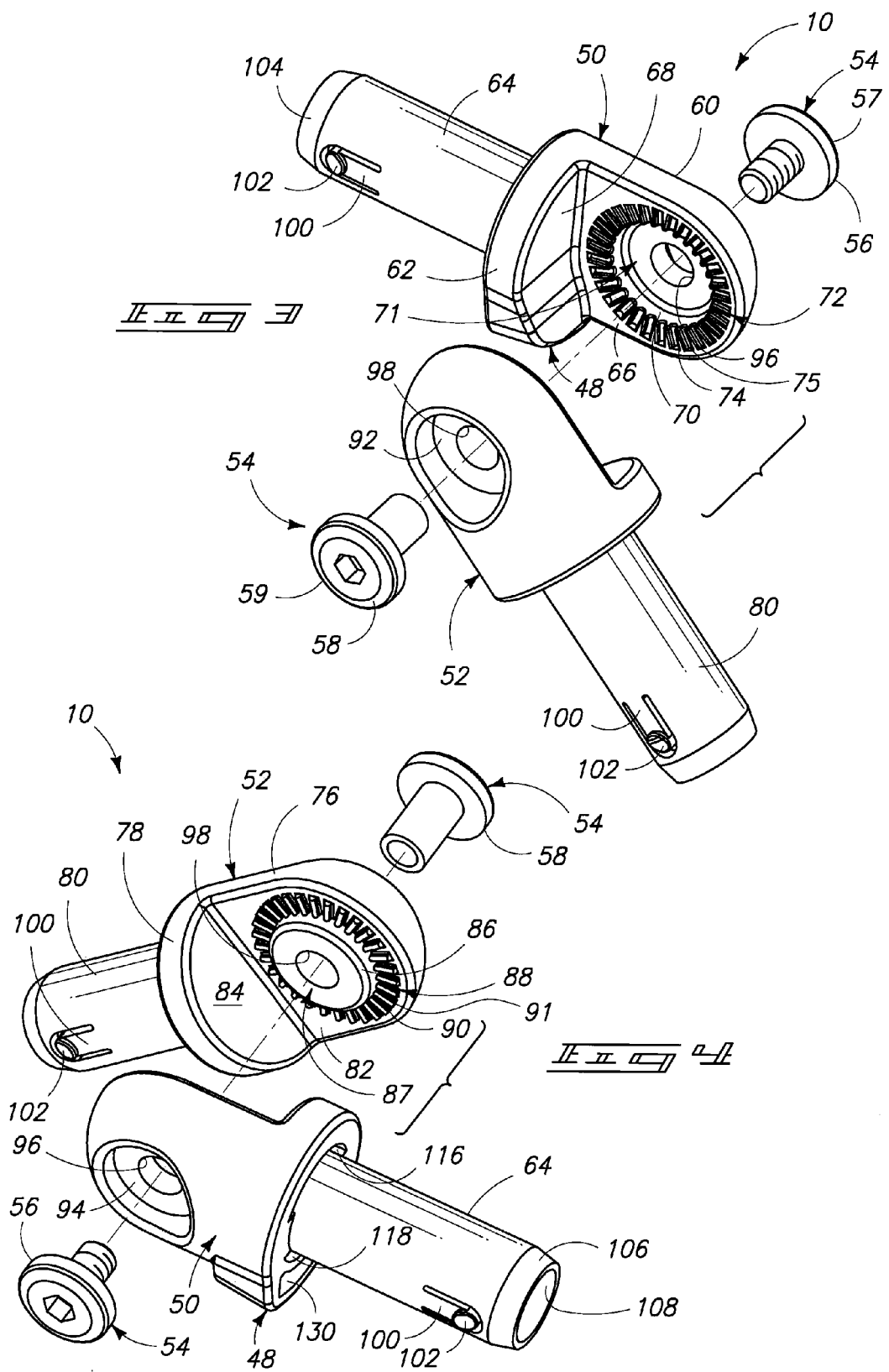

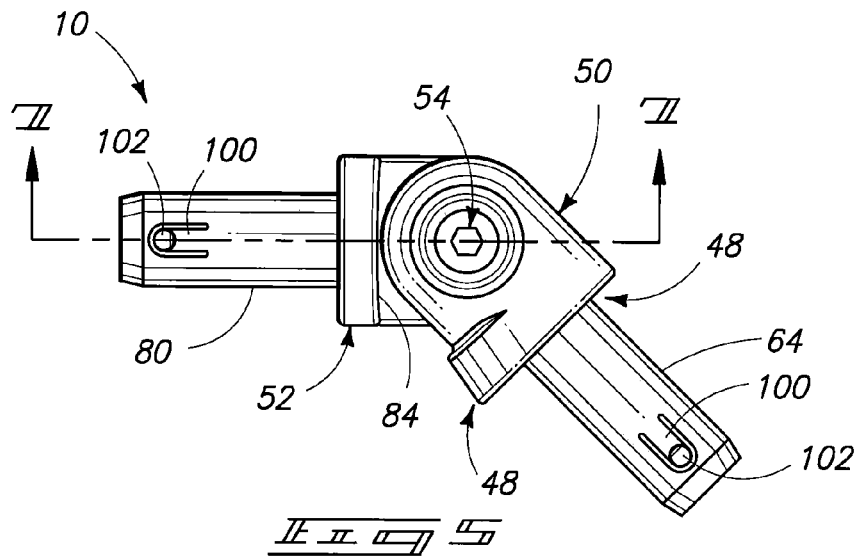
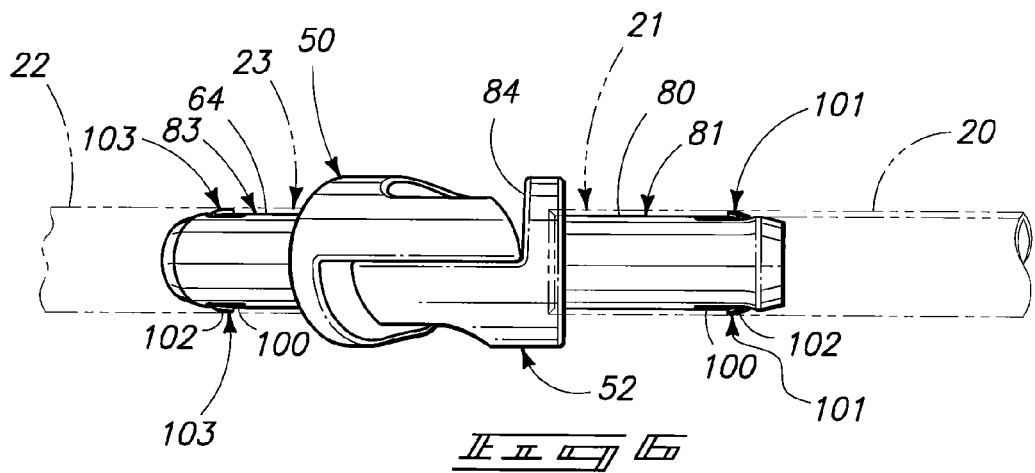
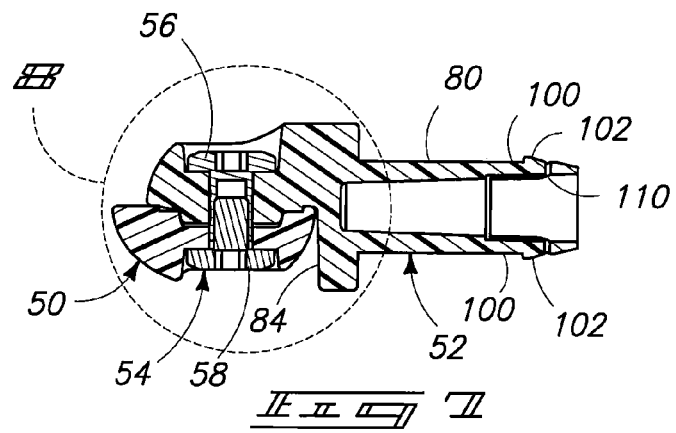

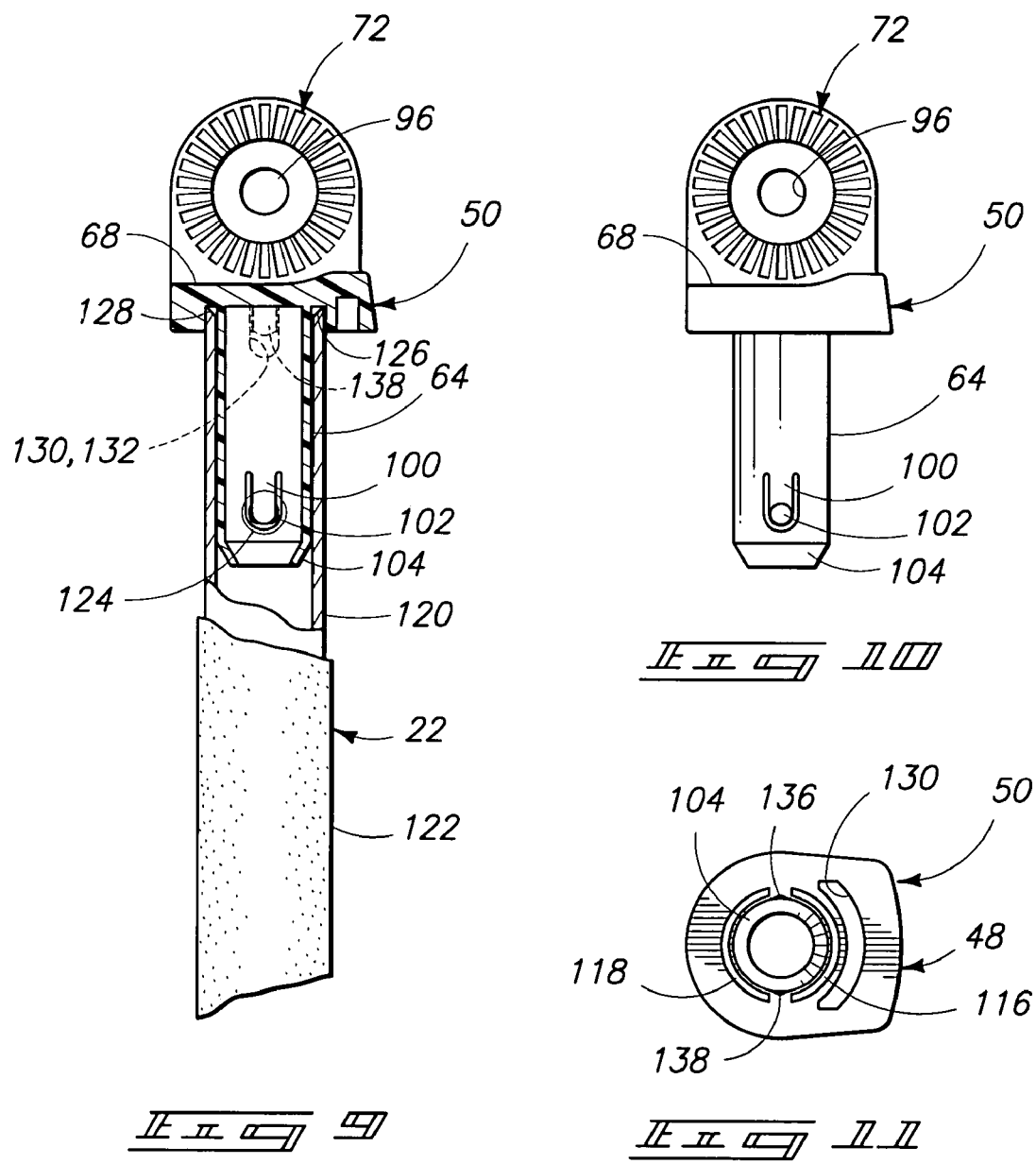

FISHING POLE HANDLE HINGE ASSEMBLY AND FISHING POLE HANDLE

TECHNICAL FIELD

The present invention pertains to fishing poles and fishing rods. More particularly, the present invention relates to pivot assemblies and handle assemblies for fishing pole handles.

BACKGROUND OF THE INVENTION

A traditional fishing pole is typically constructed with a handle, a rod, and a plurality of line guides spaced along the rod. In most cases, the rod is a straight rod. Additionally, a reel seat is provided on the handle in order to support a fishing reel. Line from the reel is then guided along the rod via the line guides, which are axially aligned along the rod. The line leaves the rod at a distal end via a terminating line guide that is provided on a tip end of the rod. In many cases, the rod is relatively long, and includes a plurality of segments that are joined together with ferrules to enable breakdown and storage of the fishing pole. Several recent attempts have been made to provide a relatively short and stubby rod. Additionally, attempts have been made to form an ergonomic configuration for the handle of the fishing pole.

For example, U.S. Pat. Nos. 5,444,934; 4,027,419; and 5,992,079 show various configurations of fishing pole handles having ergonomic configurations. For example, U.S. Pat. No. 5,992,079 illustrates an ergonomic handle having adjustable, pivotal connections between adjacent handle components. However, these constructions are typically prone to working loose or tend to never achieve completely rigid fixation when secured together. Secondly, these constructions are not provided in a modular assembly. Thirdly, such constructions tend to not self-lock in assembly. Finally, such constructions do not serve to help retain a fishing reel to a reel seat.

SUMMARY OF THE INVENTION

An improved locking pivot assembly is provided for adjusting the positioning between adjacent components in a fishing rod handle. The locking pivot assembly includes a fastener and a pair of cooperating male and female pivot components that, upon tightening of the fastener, rigidly seat together the male and female pivot members in selected, desired relative angular positions.

According to one aspect, a fishing pole handle hinge assembly is provided with a first handle element, a second handle element, and a clamp. The first handle element terminates in a contact surface having a socket. The second handle element terminates in a contact surface having a tapering head configured to be received for pivotal positioning within a socket. The claim extends between the socket and the head. The clamp is configured to compress together the socket and the head to prevent movement of the socket relative to the head.

According to another aspect, a fishing pole handle is provided with a first handle member, a second handle member, and a tightener. The first handle member has a contact surface with a rotary socket. The second handle member has a contact surface with a frustoconical head configured to seat in the rotary socket in any of a plurality of pivotal positions between the first handle member and the second handle member. The tightener is configured to compress together the socket and the ball while in one of the plurality of positions.

According to yet another aspect, a locking pivot assembly is provided for a fishing rod. The locking pivot assembly includes a first structural member, a second structural member, a female pivot pocket, a male pivot frustrum, at least one male spline, a plurality of coupling grooves, and a fastener. The female pivot pocket communicates with the first structural member. The male pivot frustrum communicates with the second structural member and is configured to couple with the female pivot pocket. The at least one male spline extends radially in relation with one of the pocket and the frustrum. The plurality of coupling grooves extends radially in relation with another of the pocket and the frustrum. The plurality of coupling grooves is configured to selectively interlock with the one of the at least one male spline as the first structural member is pivotally positioned relative to the second structural member. The fastener is configured to compress together the pocket and the frustrum and interlock the spline with a circumferentially selected one of the grooves to lock the pivot assembly into a desired angular position between the first structural member and the second structural member.

According to even another aspect, a locking pivot assembly is provided for a fishing rod handle. The pivot assembly includes a first structural, a second structural member, a clamp, and a fishing reel mounting slot. The first structural member has a first hinge portion. The second structural member has a second hinge portion. The clamp is configured to engage together the first structural member and the second structural member at a desired angle therebetween. The fishing reel mounting slot is provided in one of the first structural member and the second structural member.

BRIEF DESCRIPTION OF THE DRAWINGS

Preferred embodiments of the invention are described below with reference to the following accompanying drawings.

FIG. 3 is an exploded perspective view of the locking pivot assembly of FIGS. 1 and 2.

FIG. 4 is another exploded perspective view of the locking pivot assembly of FIG. 3, but taken from an opposite side over that depicted in FIG. 3.

FIG. 5 is a side elevational view of the locking pivot assembly of FIGS. 1-4.

FIG. 6 is a plan view of the locking picot assembly of FIG. 4 taken from above.

FIG. 7 is a sectional view of the locking pivot assembly of FIGS. 5-6 and taken along line 7-7 of FIG. 5.

FIG. 9 is a partial and centerline sectional view of a lower handle portion and a handle element of the handle locking pivot assembly of FIGS. 1-8.

FIG. 10 is an elevational view of the handle element of FIG. 9 removed from the handle portion.

FIG. 11 is a bottom end view of the handle element of FIG. 10.

DETAILED DESCRIPTION OF THE PREFERRED EMBODIMENT

Figure 1:
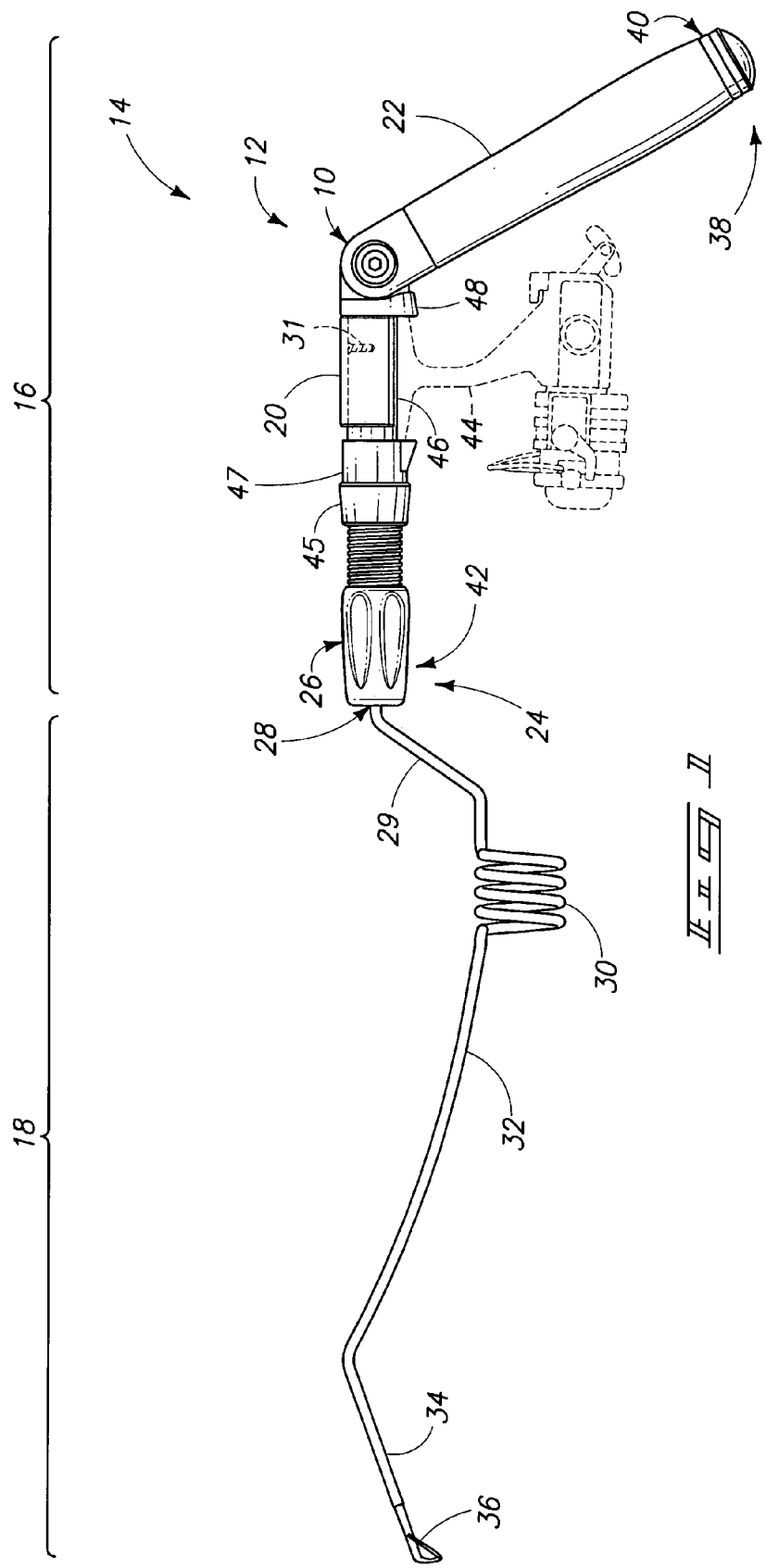
FIG. 1 is a side elevational view of a fishing pole having a locking pivot assembly provided in a handle of the fishing pole according to one aspect of the present invention.

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. An exemplary implementation is described below and depicted with reference to the drawings comprising an articulating locking pivot assembly 10 for ergonomically configuring one of a plurality of desired angular geometries for a handle 12 of a fishing pole 14.

While the invention is described by way of a preferred embodiment, it is understood that the description is not intended to limit the invention to this embodiment, but is intended to cover alternatives, equivalents, and modifications which may be broader than the embodiment, such as are defined within the scope of the appended claims.

In an effort to prevent obscuring the invention at hand, only details germane to implementing the invention will be described in great detail, with presently understood peripheral details being incorporated by reference, as needed, as being presently understood in the art.

Fishing pole 14 includes a handle assembly 16 that removably supports a rod 18. According to one construction, rod 18 is removably supported for mating and demating with handle assembly 16 using a mating and demating connector assembly 24. In another construction, rod 26 may be directly connected to handle assembly 16 without using a removable connector assembly. Further details of rod 18 and connector assembly 24 are set forth in co-pending U.S. patent application Ser. No. 10/607,285, entitled "Fishing Rod", and Ser. No. 10/655,792, entitled "Fishing Rod Connector, and Connector Assemblies for Fishing Poles", both of which are herein incorporated by reference.

Fishing pole 14 includes an ergonomically adjustable handle 12, wherein locking pivot assembly 10 can be repositioned to form a desired angle between an upper handle portion 20 and a lower handle portion 22 of handle 12. Locking pivot assembly 10 is loosed to reposition portions 20 and 22 in order to form a desire angle therebetween, and is tightened in order to secure the desired angle.

Fishing pole 14 also removably supports a fishing reel 44 onto which a fishing line is spooled for removal and retrieval when casting and retrieving a fishing hook (not shown). Fishing reel 44 is removably attached to reel seat 46 of handle assembly 16.

As shown in FIG. 1, handle assembly 16 includes handle 12 which is provided by upper handle portion 20, locking pivot assembly 10, and lower handle portion 22. More particularly, lower handle portion 22 is attached to upper handle portion 20 at a desired angular orientation by adjusted articulation of locking pivot assembly 10 to a desired orientation. According to such construction, lower handle portion 22 is pivotally repositioned by loosening and adjusting locking pivot assembly 10 in order to achieve a desired relative angle between portions 20 and 22 for use by a user. Locking pivot assembly 10 is then tightened to secure the angle. Handle assembly 16 includes a proximal end 40 and a distal end 42.

Furthermore, handle assembly 16 includes an adjustable weighting system 38 that is removably mounted or attached to handle assembly 16. According to one construction, weighting assembly 38 is removably mounted to lower handle portion 22 of handle assembly 16. Although such is shown to be exemplary, weighting system 38 may be removably mounted to other portions of handle assembly 16, depending on various other configurations of fishing pole 14. Further details of weighting system 38 are set forth in co-pending U.S. patent application Ser. No. 10/679,224, entitled "Fishing Poles, Counter-balancing Apparatus for Fishing Poles and Fishing Pole Handles, and Methods for Balancing Fishing Poles", which is herein incorporated by reference. Optionally, weighting system 38 can be omitted from handle assembly 16.

Connector assembly 24 is formed between a distal end of upper handle portion 18 and a proximal end of rod 18. Connector assembly 24 includes a female connector member 26 affixed to handle 12 and a male connector member 28 affixed to rod 18. Hence, rod 18 can be removed from handle assembly 16 for storage and transport.

Spinning reel 44 is removably attached to reel seat 46 of upper handle portion 20 on handle assembly 16. Upper handle portion 20 includes a retaining collar 48 that is integrally formed within locking pivot assembly 10. Handle portion 20 also includes a threaded locking ring (or nut) 45 and an opposed retaining collar 47 that cooperates with a slot 130 (see FIG. 4) in collar 48 to secure reel 44 onto reel seat 46. More particularly, each retaining collar 48 and 47 includes a local, outward detent (such as slot 130 of FIG. 4) that is configured to receive a respective finger end of a reel seat member on reel 44. Although reel seat 46 is shown along a bottom surface of handle portion 18, it is understood that alternative constructions can provide a reel seat atop handle portion in order to accommodate a top-mounted casting reel.

Collar 47 is adjusted in fore and aft directions by rotating threaded locking ring 45 along complementary threads on handle assembly 16 to move ring 45 and retaining collar 47 so as to entrap and release, respectively, reel 44 from reel seat 46 via collars 48 and 47.

As shown in FIG. 1, fishing rod 18 includes a base portion 29, which supports a coil spring 30, a bowed portion 32, and a tip 34. Tip 34 terminates in a line guide 36.

Figure 2:
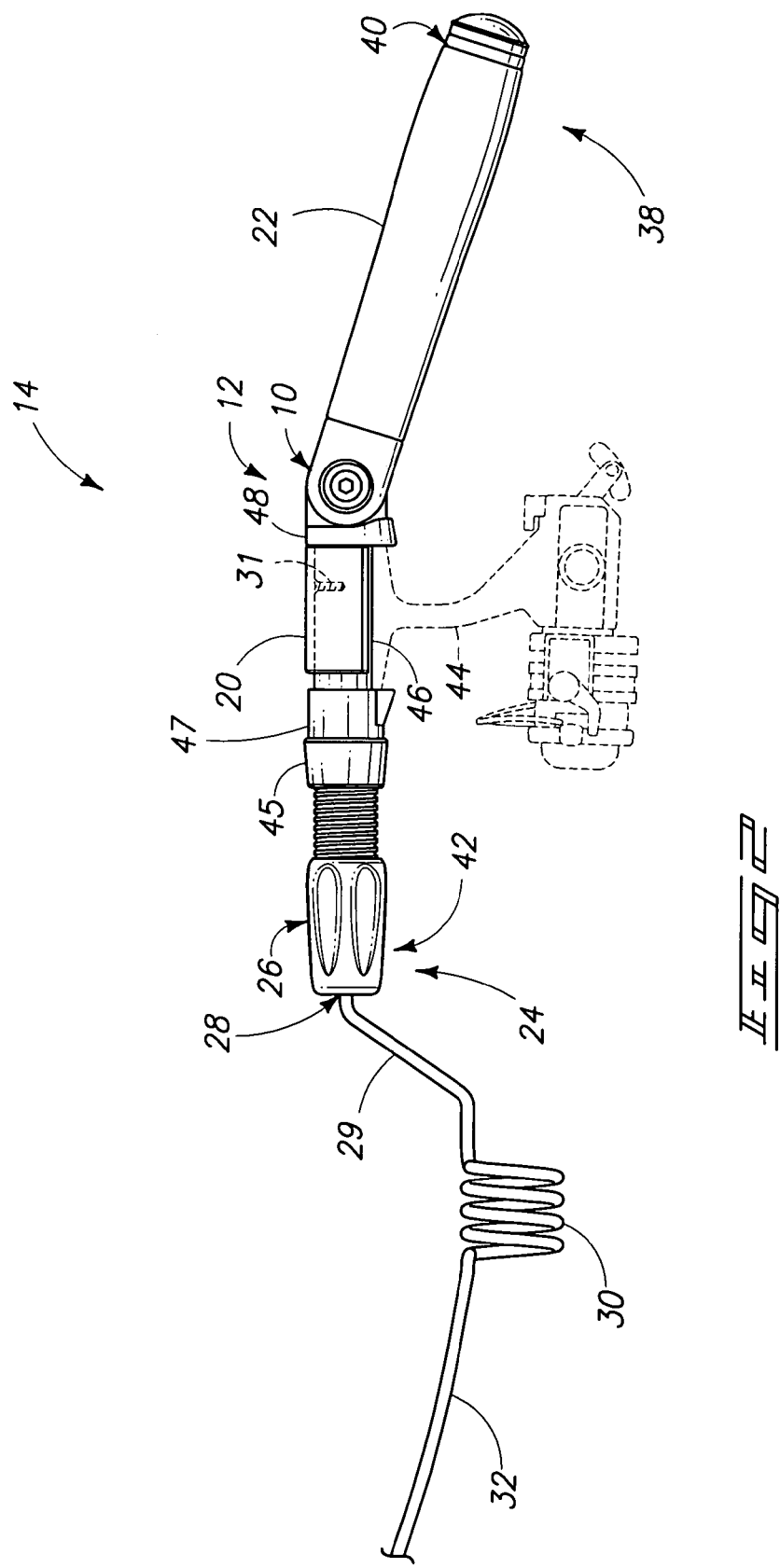
FIG. 2 is another side elevational view of the fishing pole of FIG. 1, in partial view, and depicting the handle pivoted and locked in a second position over that depicted in FIG. 1.

FIG. 2 depicts handle 12 of fishing pole 14 after being reconfigured into an alternative ergonomic configuration. More particularly, the angle formed between upper handle portion 20 and lower handle portion 22 has been increased (over that depicted in FIG. 1) by loosening locking pivot assembly 10, rotating pivot assembly 10 to a desired angular orientation, and tightening locking pivot assembly 10 to affix (or lock) the desired angle.

FIGS. 3 and 4 illustrate in greater detail one suitable construction for locking pivot assembly 10. More particularly, locking pivot assembly 10 includes a first handle element (or portion) 50, a second handle element (or portion) 52, and a tightener (or clamp) 54. As used herein, the term "tightener" refers to any apparatus that engages together elements 50 and 52, such as a clamp, fastener, clasp, clincher, clip, hasp, hold-fast, holder, or catch. Clamp 54 includes a threaded hexagonal head screw 56 and a hexagonal head threaded nut 58. Screw 56 is received through a bore 96 in element 50, whereas nut 58 is received through a bore 98 in element 52. According to one construction, elements 50 and 52 are constructed from polycarbonate. Alternatively, elements 50 and 52 can be formed from any metal, plastic, composite, or other structural material. Also according to one construction, screw 56 and nut 58 are constructed from chrome plated steel. Alternatively, screw 56 and nut 58 are made from stainless steel, steel, or any structural plastic or composite material.

As shown in FIG. 3, element 50 includes an offset finger 60, an enlarged base 62, and a hollow shaft 64. Finger 60 forms a contact surface 66 offset to one side of base 62 in order to form a lateral surface 68. A socket 70 is formed in contact surface 66, centered about bore 96. Socket 70 forms a female pivot pocket 71. Likewise, a circumferential array 72 of slots 74 are provided about socket 70, also centered about bore 96. Slots 74 each provide a coupling groove 74. Shaft 64 also includes a pair of opposed, flexible fingers 100 that each terminate in a clip 102 that has a beveled insertion face and a sharp, perpendicular rear face that prevents withdrawal of clip 102 from within a complementary hole in a handle element tube (not shown). Shaft 64 also has a beveled leading end 104 configured to facilitate insertion of shaft 64 within a complementary bore in a handle element (not shown).

As shown in FIG. 4, element 52 includes an offset finger 76, and enlarged base 78, and a hollow shaft 80. Finger 76 forms a contact surface 82 offset to one side of base 78 so as help define a lateral surface 84. A head 86 is formed on contact surface 82, centered about bore 98. Head 86 provides a male pivot frustrum 87. Likewise, a circumferential array 88 of raised splines 90 are provided about head 86, also centered about bore 98. Each spline 90 is a male spline 91. Shaft 80 also includes a pair of opposed, flexible fingers 100 that each terminates in a clip 102 that has a beveled insertion face and a sharp, perpendicular rear face that prevents withdrawal of clip 102 from within a complementary hole in a handle element tube (see FIG. 9). Shaft 80 also has a beveled leading end 106 extending about open bore 108 and configured to facilitate insertion of shaft 80 within a complementary bore in a handle element (see FIG. 9).

As shown in FIG. 3, element 52 includes a recessed surface 92 about bore 98 for receiving nut 58 therein in assembly. Likewise, element 54 of FIG. 4 includes a recessed surface 94 about bore 96 for receiving screw 56 therein in assembly.

According to one construction, element 50 provides a first handle element that terminates in a contact surface 60 having a socket 70. Additionally, element 52 provides a second handle element terminating in a mating contact surface having a tapering head 86 configured to be received for pivotal positioning within socket 70. Fastener 54, comprising threaded screw 56 and threaded nut 58, provide a clamp extending between socket 70 and head 86 which is configured to compress together socket 70 and head 86 to provide rigid affixment therebetween and to prevent movement of socket 70 relative to head 86. Threaded screw 56 and threaded nut 58 provide first and second fasteners 57 and 59, respectively. Accordingly, a rigid connection is provided between elements 50 and 52 at a desired angular position.

Additionally, element 50 includes a plurality of apertures in the form of slots 74 that are sized to receive a plurality of complementary projections in the form of splines 90 on element 52. Splines 90 and apertures 74 each taper in depth and are configured in a circumferential and radially extending array in order to accommodate selected rotary positioning of element 50 in a desired angular position relative to element 52. When fastener 54 is tightened, splines 90 are snugly received into slots 74 to fix pivot assembly 10 and to prevent rotation between elements 50 and 52. Forcible engagement of an outer surface of head 86 into slot 74 concurrently provides for rigid affixation of pivot assembly 10 into such desired angular position. A tapering configuration on head 86 and within socket 70 imparts increasing tightness between elements 50 and 52 as fastener 54 is further tightened.

In order to adjust a desired angle between elements 50 and 52, a user needs to merely loosen fastener 54 (i.e., partially unthread screw 56 from nut 58) in order to provide sufficient clearance so that splines 90 can be separated from slot 74 to facilitate rotation of element 50 with respect to fastener 54 into a new desired angular orientation, after which splines 90 are reinserted into a new desired complementary set of slots 74 and fastener 54 is further tightened.

FIG. 4 further illustrates a pair of arcuate and axially extending slots 116 and 118 which mate with fingers on a handle element so as to prevent rotation therebetween in assembly. Furthermore, slot 130 is configured to receive a finger member on a fishing reel for securement of one end of such structure therein.

FIGS. 5-7 further illustrate the configuration of element 50 with respect to element 52 when assembled together via a clamp using fastener 54. More particularly, fastener 54 is shown in a tightened, or completely compressed, configuration, thereby realizing a desired angular orientation between elements 50 and 52. As shown in FIG. 6, a first structural member 81 on element 52 and a second structural member 83 on element 50 are secured within respective first and second hollow end portions 21 and 23 of handle portions 20 and 22 using first and second fasteners 101 and 103, respectively. Fasteners 101 and 103 each include a pair of clips 102 that mate within apertures (see aperture 124 of FIG. 9) in each hollow end portion 21 and 23.

Figure 8:
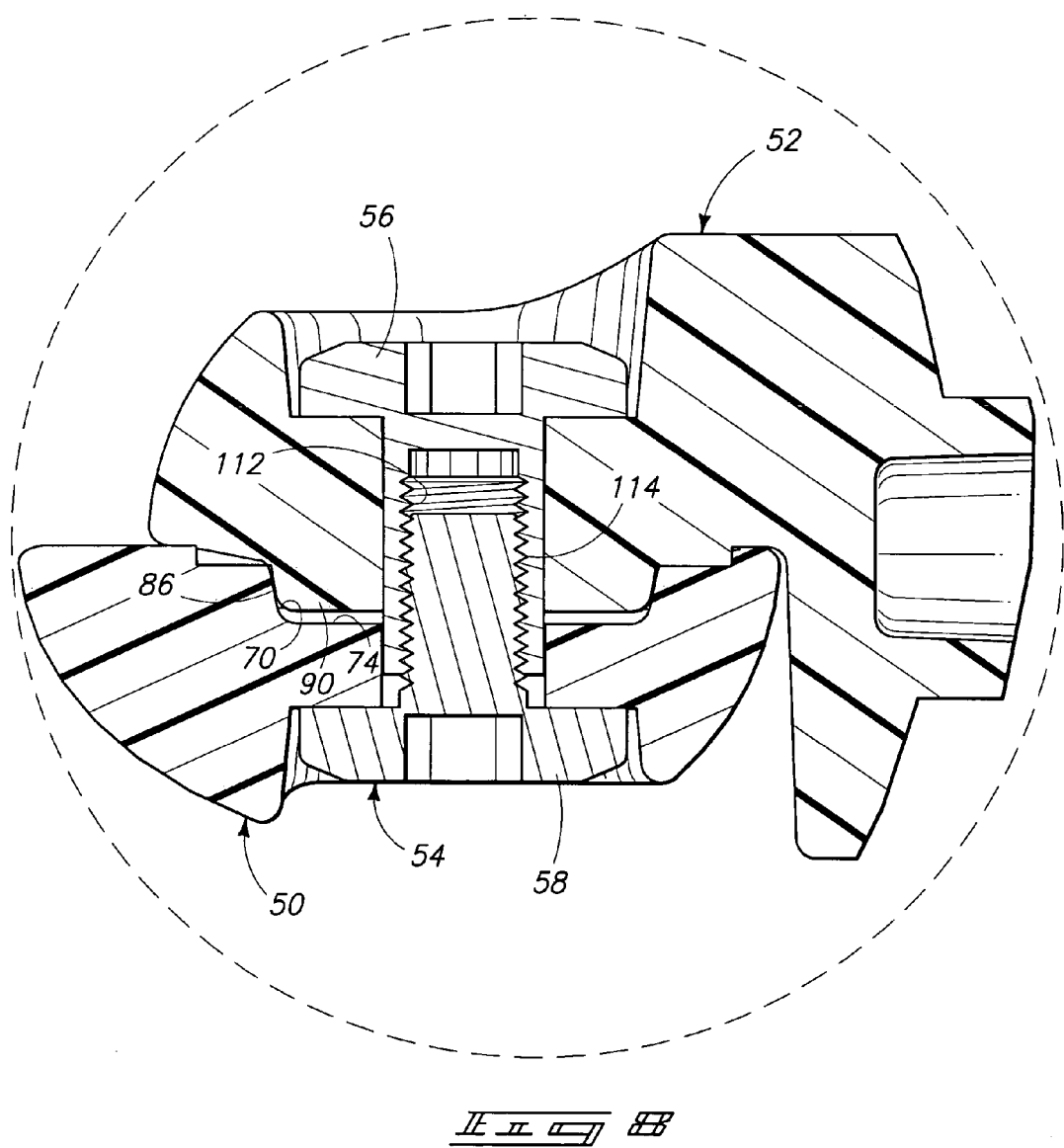
FIG. 8 is an enlarged sectional view taken from the encircled region 8 of FIG. 7.

FIG. 8 illustrates in enlarged detail view a tightened configuration for fastener 54. More particularly, screw 58 includes a threaded male portion 114 that is received in complementary engagement with a threaded female portion 112 on nut 56. By tightening together screw 58 and nut 56, elements 50 and 52 are forcibly engaged together to eliminate any looseness therebetween. Looseness in all directions is eliminated by forcibly urging socket 70 into head 86 as both structures include a frustoconical outer and inner portion, respectively. Additionally, individual splines 90 are received within respective slots 74 when assembled together therebetween, which further restricts rotation between elements 50 and 52 about a central pivot axis defined by fastener 54.

FIG. 9 illustrates assembly of element 50 onto an aluminum tube 120 within lower handle portion 22. It is understood handle element 52 is similarly affixed onto another aluminum tube within upper handle portion 20. More particularly, shaft 64 of element 50 is axially received within an inner bore of tube 120. A pair of cylindrical apertures 124 are provided on opposite sides of tube 120 at a location such that clips 102 snap into position in respective apertures 124 so as to lock element 50 onto tube 120.

Additionally, a pair of end slots 130 and 132 are provided opposite one another on one end of tube 120. Slots 130 and 132 are sized to receive a pair of ribs 136 and 138 (see FIG. 11) and to further define a pair of fingers 126 and 128 on an adjacent end of tube 120. Fingers 126 and 128 are received into complementary sized arcuate slots 116 and 118 in element 50. Ribs 136 and 138 cooperate with slots 130 and 132 to prevent of rotation of element 50 atop tube 120.

In assembly, clips 102 serve to axially lock element 50 onto tube 120. Additionally or optionally, an adhesive material such as epoxy is also provided between element 50 and an inner diameter of tube 120 to further secure element 50 onto tube 120. Even further optionally, a threaded fastener (e.g., fastener 31 in FIGS. 1-2) can be received through a wall portion of tube 120 and into a complementary hole in hollow shaft 64 to secure element 50 within tube 120. According to such optional or additional implementation, cork 22 is adhesively applied atop such fastener in order to hide the appearance of such fastener.

According to the construction depicted in FIGS. 9-11, element 50 (as well as element 52) are each constructed from poly carbonate material. Alternatively, any of a number of plastic or composite materials can be utilized to construct elements 50 and 52.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A fishing rod handle having a locking pivot assembly, comprising:
   a first handle element having a first hollow end portion;
   a second handle element having a second hollow end portion;
   a first structural member configured to be received within the first hollow end portion;
   a second structural member configured to be received within the second hollow end portion;
   a first fastener for securing the first structural member within the first hollow end portion;
   a second fastener for securing the second structural member within the second hollow end portion;
   a female pivot pocket communicating with the first structural member;
   a male pivot frustrum communicating with the second structural member and configured to couple with the female pivot pocket to provide pivotal positioning between the first handle element and the second handle element within a pivot plane;
   at least one male spline extending radially in relation with one of the pocket and the frustrum and parallel with the pivot plane;
   a plurality of coupling grooves extending radially in relation with another of the pocket and the frustrum and parallel with the pivot plane and configured to selectively interlock with the one of the at least one male spline as the first structural member is pivotally positioned relative to the second structural member; and
   a fastener configured to compress together the pocket and the frustrum and interlock the spline with a circumferentially selected one of the grooves to lock the pivot assembly into a desired angular position within the pivot plane between the first structural member and the second structural member;
   wherein the first and second fastener each comprise a flexible finger having a clip provided on one of the first structural member and the second structural member configured to mate with an aperture provided in one of the first hollow end portion and the second hollow end portion.

2. The fishing rod handle of claim 1, wherein the first and second fastener each comprises a threaded fastener.

3. The fishing rod handle of claim 1 wherein the female pivot pocket comprises a tapered cylindrical recess provided in a contact surface of the first handle element.

4. The fishing rod handle of claim 1 wherein the pivot frustrum comprises a tapered cylindrical head extending from a contact surface of the second handle element.

5. The fishing rod handle of claim 1 wherein the female pivot pocket comprises a frustoconical recess provided in a contact surface of the first handle element.

6. The fishing rod handle of claim 1 wherein the pivot frustrum comprises a frustoconical head extending from a contact surface of the second handle element.

7. The fishing rod handle of claim 1 wherein one of the first handle element and the second handle element comprises a protuberance extending radially of a pivot axis between the first handle element and the second handle element that provides the male spline and a plurality of recesses that provide the plurality of coupling grooves each configured to selectively receive the protuberance when the first handle element and the second handle element are compressed together with the fastener.

8. The fishing rod handle of claim 7 wherein the pivot frustrum and the female pivot pocket are configured in assembly to engage in interference relation responsive to the fastener imparting compression therebetween.

9. The fishing rod handle of claim 8 wherein the protuberance is a radial spline, the plurality of recesses are radial slots, and further comprising a plurality of radial splines configured to internest in selected pivotal positions with respective ones of the plurality of slots to realize desired angular positions between the first handle element and the second handle element when compressed together with the fastener.

10. The fishing rod handle of claim 1 wherein the fastener extends between an aperture in the first handle element and an aperture in the second handle element and is configured to forcibly engage together and disengage the first handle element and the second handle element.

11. A fishing rod handle having a locking pivot assembly, comrprising:
    a first handle element having a first end bore;
    a second handle element having a second end bore;
    a first structural member having a first hinge portion configured to be received within the first end bore;
    a second structural member having a second hinge portion configured to be received within the second end bore;
    a first fastener for securing the first structural member within the first end bore;
    a second fastener for securing the second structural member within the second end bore;
    a clamp configured to engage together the first structural member and the second structural member at a desired angle therebetween within a pivot plane; and
    a circumferential array of radially extending splines provided on one of the first structural member and the second structural member and provided parallel with the pivot plane and a complementary circumferential and radially extending array of slots provided in another of the first structural and the second structural member provided parallel with the pivot plane and configured to selectively mate together to retain a desired angular positioning between the first structural member and the second structural member when the clamp is configured in a released position, and to secure the desired angular position when the clamp is engaged in a compressed configuration;
    wherein at least one of the first handle element and the second handle element comprises an axial shaft including a clip configured to engage with an aperture within a respective handle portion of the fishing pole to provide one of the first fastener and the second fastener and secure the at least one of the first handle member and the second handle member therein.

12. The fishing rod handle of claim 11 wherein the first hinge member comprises a frustoconical hollow provided in a contact surface of the first handle element.

13. The fishing rod handle of claim 11 wherein a contact surface on one of the first handle element and the second handle element comprises a projection extending therefrom and a contact surface on another of the first handle element and the second handle element comprises a plurality of complementary apertures sized to selectively receive the projection and configured in a spaced-apart circumferential array to accommodate rotary positioning of the projection into a selected one of the apertures.

14. The fishing rod handle of claim 11 wherein the clamp comprises a threaded fastener.

15. The fishing rod handle of claim 14 wherein the threaded fastener comprises a screw having a threaded portion and a nut having a complementary threaded portion.

16. The fishing rod handle of claim 11 wherein one of the first handle element and the second handle element comprises a collar having a slot for retaining a finger on a fishing reel for securement along a reel seat of the fishing rod handle.

17. The fishing rod handle of claim 11 wherein at least one of the first handle element and the second handle element includes one of a finger and a slot configured to mate in axial relation with a complementary another of the slot and the finger to affix the one of the first handle member and the second handle member to a handle portion of the fishing pole to prevent rotation therebetween.

* * * * *

UNITED STATES PATENT AND TRADEMARK OFFICE
CERTIFICATE OF CORRECTION

| | |
|---|---|
| PATENT NO. | : 7,454,862 B2 |
| APPLICATION NO. | : 11/058838 |
| DATED | : November 25, 2008 |
| INVENTOR(S) | : Duane C. Markley and Ronald G. Stokes |

It is certified that error appears in the above-identified patent and that said Letters Patent is hereby corrected as shown below:

Col. 1, Line 52; delete "claim" after "The" and insert --clamp--.

Col. 2, Line 19; insert --member-- after "structural".

Col. 2, Line 44; delete "picot" after "locking" and insert --pivot--.

Signed and Sealed this

Second Day of June, 2009

JOHN DOLL
*Acting Director of the United States Patent and Trademark Office*